United States Patent
Onodera

(10) Patent No.: US 6,508,139 B2
(45) Date of Patent: Jan. 21, 2003

(54) BY-WIRE SHIFT LEVER DEVICE FOR VEHICLE

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/924,798

(22) Filed: Aug. 8, 2001

(65) Prior Publication Data
US 2002/0020236 A1 Feb. 21, 2002

(30) Foreign Application Priority Data
Aug. 18, 2000 (JP) ....................... 2000-248780

(51) Int. Cl.$^7$ ............................... F16H 59/10
(52) U.S. Cl. ................... 74/335; 74/473.21
(58) Field of Search ............... 74/335, 473.12, 74/473.21, 473.3

(56) References Cited

U.S. PATENT DOCUMENTS

| | | | | |
|---|---|---|---|---|
| 4,646,582 A | * | 3/1987 | Kijima | .............. 74/473.33 |
| 4,800,721 A | * | 1/1989 | Cemenska et al. | ............ 74/491 |
| 5,035,113 A | * | 7/1991 | Simonyi et al. | .............. 74/335 |
| 5,179,867 A | * | 1/1993 | Sakakibara et al. | ........... 74/335 |
| 6,105,453 A | * | 8/2000 | Ooyama et al. | .............. 74/335 |

FOREIGN PATENT DOCUMENTS

JP        A1 3076170        6/2000

* cited by examiner

Primary Examiner—Sherry Estremsky
(74) Attorney, Agent, or Firm—Brinks Hofer Gilson & Lione

(57) ABSTRACT

A by-wire shift lever device for a vehicle that is compact, lightweight, and has a desirable operability. The by-wire shift lever device includes a shift lever; a lock release switch provided in the shift lever; a position sensor for transmitting a position signal according to a direction and an amount of operation of the shift lever; and an actuator for applying an external force to the shift lever. When the shift lever at a predetermined position is operated in a certain direction without operating the lock release switch, the actuator is driven to apply an external force in a direction opposite to the direction of operation to the shift lever so as to prohibit the operation of the shift lever to other shift positions.

20 Claims, 5 Drawing Sheets

BY-WIRE SHIFT LEVER DEVICE FOR VEHICLE

BACKGROUND OF THE INVENTION

1. Field of the Invention

The present invention relates to a by-wire shift lever device for a vehicle in a drive-by-wire system, and in particular to a structure of a shift lever mechanism of an automatic transmission shift lever device.

2. Description of the Prior Art

Conventionally, an automatic shift lever device for a vehicle includes a transmission shifting means using a mechanical linking mechanism. Recently, in order to deal with computerized equipment mounted in a car, a shift-by-wire transmission shifting means is proposed, in which a shift position of a shift lever is detected by a positioning sensor first, and then an actuator such as a solenoid or a motor is driven in according to an output signal from the positioning sensor to drive a fork for shifting the transmission.

With the automatic shift lever device for a vehicle having the shift-by-wire transmission shifting means, there is no need to provide large and complicated linking mechanisms between an engine compartment and a driver's seat. Instead, only a few wires are needed, thus enabling to improve the designing flexibility of vehicles.

An automatic shift lever device for a vehicle includes an operation-locking mechanism that prevents misoperation of a shift lever so that unless a lock release button provided to the shift lever is depressed, operation of the shift lever from "Park" to "Reverse", from "Reverse" to "Park", and from "Neutral" to "Reverse" is prevented. To improve ease of operation of the shift lever, it needs to have a resistance imparting mechanism which gives the right amount of resistance to the shift lever when the shift lever is shifted from one position to another position.

Likewise, a conventional automatic by-wire shift lever device for a vehicle includes the above-described mechanisms. However, similar to an automatic shift lever device for a vehicle employing the mechanical linking mechanisms, the conventional by-wire shift lever device includes the operation-locking mechanism and the resistance imparting mechanism both having mechanical means. Therefore, a shift lever mechanism cannot be simplified, and thus it is impossible to take full advantage of the by-wire system.

SUMMARY OF THE INVENTION

The present invention has been achieved to solve the above-described problems, and its object is to provide a by-wire shift lever device for a vehicle that is compact, lightweight and has desirable operability.

In order to solve the above-described problems, the present invention firstly has a structure including: a shift lever; a position sensor for transmitting a position signal according to a direction and an amount of operation of the shift lever; an actuator for applying an external force to the shift lever; and a control section for receiving the position signal and controlling the actuator according to the position signal, wherein when the control section determines from the position signal that the shift lever is positioned at a predetermined shift position, the control section controls the actuator to apply the external force so as to lock the shift lever in the shift position.

According to the structure, when the shift lever is being shifted to a predetermined shift position, the actuator applies the external force to the shift lever, thereby locking the shift lever in the shift position. Accordingly, it is possible to greatly simplify the structure of the shift lever as compared to a shift lever having a mechanical operation-locking mechanism, thus downsizing the shift lever device for a vehicle.

In order to solve the above-described problems, the present invention secondly has a structure including: a shift lever; a lock release switch provided in the shift lever; a position sensor for transmitting a position signal according to a direction and an amount of operation of the shift lever; an actuator for applying an external force to the shift lever; and a control section for controlling the actuator, the control section being connected to the lock release switch and receiving the position signal, wherein when the control section receives the position signal indicating the shift lever at a predetermined position being operated in a certain direction without operating the lock release switch, the control section controls the actuator to prohibit the operation of the shift lever in the certain direction.

According to the structure, when the shift lever is operated from the predetermined shift position in the certain direction without operating the lock release switch, the actuator applies the external force to the shift lever so as to prohibit the operation of the shift lever from the predetermined shift position in the certain direction. Accordingly, it is possible to greatly simplify the structure of the shift lever as compared to a shift lever having a mechanical operation-locking mechanism, thus downsizing the shift lever device for a vehicle.

In order to solve the above-described problems, the present invention thirdly has a structure including: a shift lever; a position sensor for transmitting a position signal according to a direction and an amount of operation of the shift lever; an actuator for applying an external force to the shift lever; and a control section for receiving the position signal and controlling the actuator according to the received position signal, wherein when the control section receives the position signal indicating the shift lever being operated, the control section controls the actuator to apply the external force according to the position signal so as to impart a resistance associated with the operation of the shift lever.

According to the structure, when the shift lever is operated, the actuator applies the external force to the shift lever so as to impart the resistance to the operation of the shift lever. Accordingly, it is possible to greatly simplify the structure of the shift lever as compared to a shift lever having a mechanical resistance imparting mechanism, thus downsizing the shift lever device for a vehicle.

In order to solve the above-described problems, the present invention fourthly has a structure including: a shift lever; a position sensor for transmitting a position signal according to a direction and an amount of operation of the shift lever; an actuator for applying an external force to the shift lever; a finger detecting sensor for transmitting a detection signal by detecting touch of fingers on the shift lever; and a control section for receiving the position signal and the detection signal and controlling the actuator according to the position signal and the detection signal, wherein when the control section receives the detection signal, the control section controls the actuator to apply to the shift lever the external force in a mode unique to the shift position of the shift lever so as to give an operator a tactile feedback on the shift position of the shift lever.

According to the structure, when the fingers of the operator touch the shift lever, the actuator applies the external force to the shift lever so as to apply to the shift lever the external force in a mode unique to each shift position. Accordingly, it is possible to give the operator a tactile feedback on the shift position of the shift lever, thus enabling to ease the operation of the shift lever.

In order to solve the above-described problems, the present invention fifthly has a structure including: a shift lever; a position sensor for transmitting a position signal according to a direction and an amount of operation of the shift lever; an actuator for applying an external force to the shift lever; and a control section for receiving the position signal and controlling the actuator according to the position signal, wherein when the shift lever is shifted from one position to another position by the position signal, the control section controls the actuator to apply to the shift lever the external force in a mode unique to the other shift position so as to give an operator a tactile feedback on the shift position of the shift lever.

According to the structure, when the shift lever is shifted from one position to another position, the actuator applies the external force to the shift lever so as to apply to the shift lever the external force in a mode unique to the shift position after being shifted. Accordingly, it is possible to give the operator a tactile feedback on the shift position of the shift lever after being shifted, thus enabling to ease the operation of the shift lever.

In order to solve the above-described problems, the present invention sixthly has a structure in which a voice coil motor is employed as the actuator.

According to the structure, unlike a rotary motor is employed as an actuator, wherein a mechanism to transfer rotary motion to linear motion in needed, it is possible to downsize the shift lever device for a vehicle as compared to the case where the rotary motor is used.

In order to solve the above-described problems, the present invention seventhly has a structure in which a latching means for holding a shift lever in a predetermined position is provided.

According to the structure, since the shift lever can be held at the predetermined shift position, it is possible to interrupt supplying of power to the actuator while the shift lever is held by the latching means, thus enabling to reduce consumption of a battery mounted on a vehicle.

DESCRIPTION OF THE PREFERRED EMBODIMENTS

Figure 1:
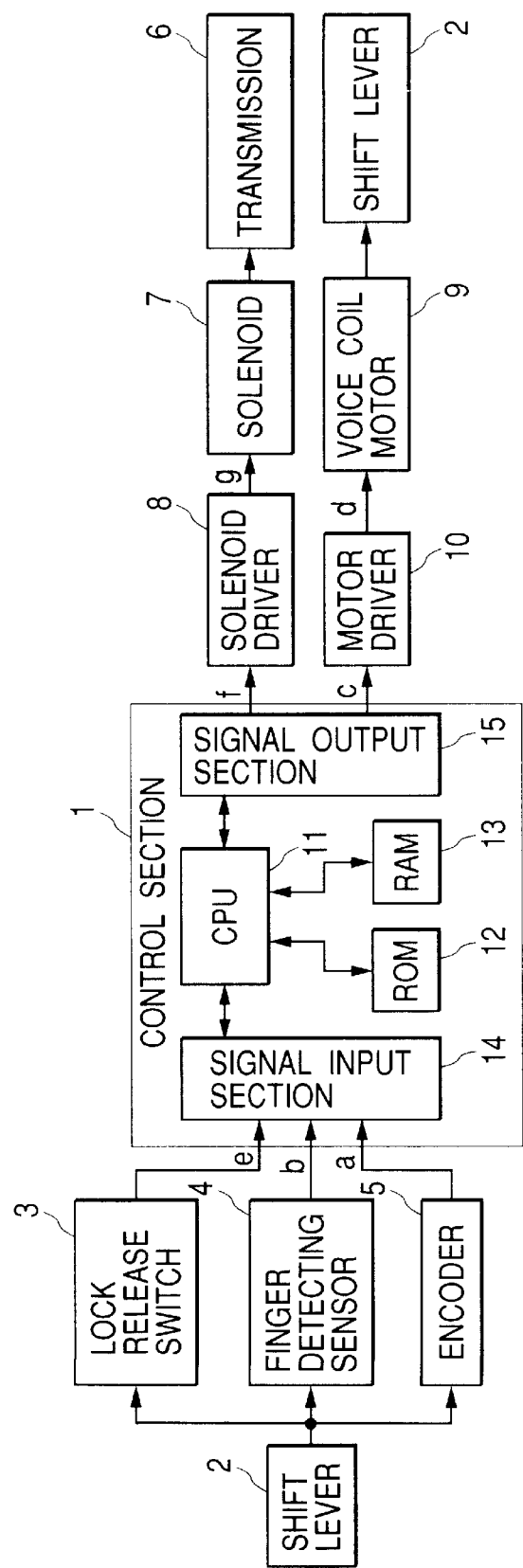
FIG. 1 is a block diagram of a shift lever device for a vehicle according to a first embodiment of the present invention.
Figure 2:
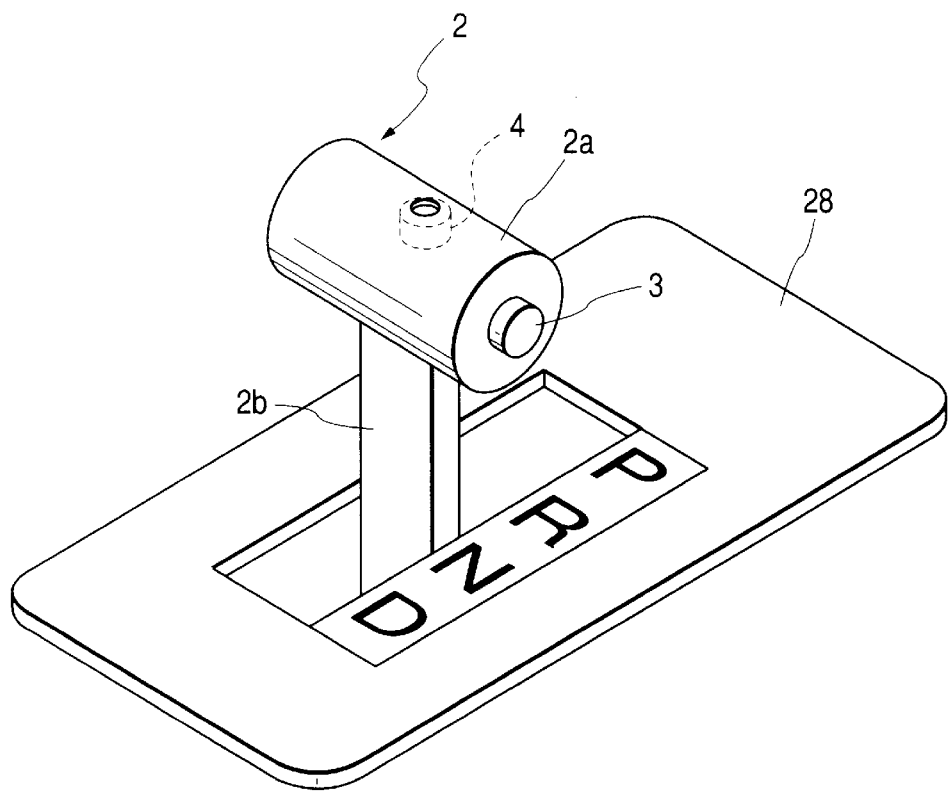
FIG. 2 is a perspective view of a shift lever and a shift position display provided in a shift lever device for a vehicle according to the first embodiment of the present invention.
Figure 3:
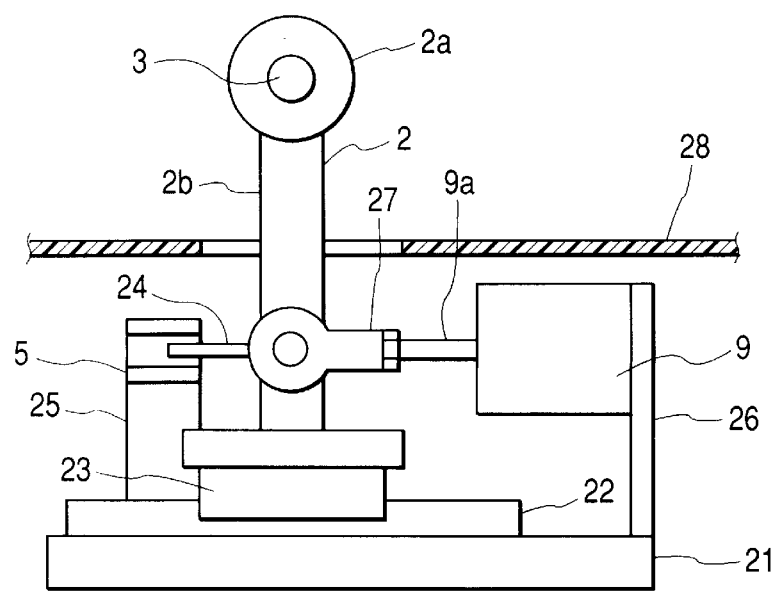
FIG. 3 is a front view, partially in cross-section, of mechanisms provided in a shift lever device for a vehicle according to the first embodiment of the present invention.
Figure 4:
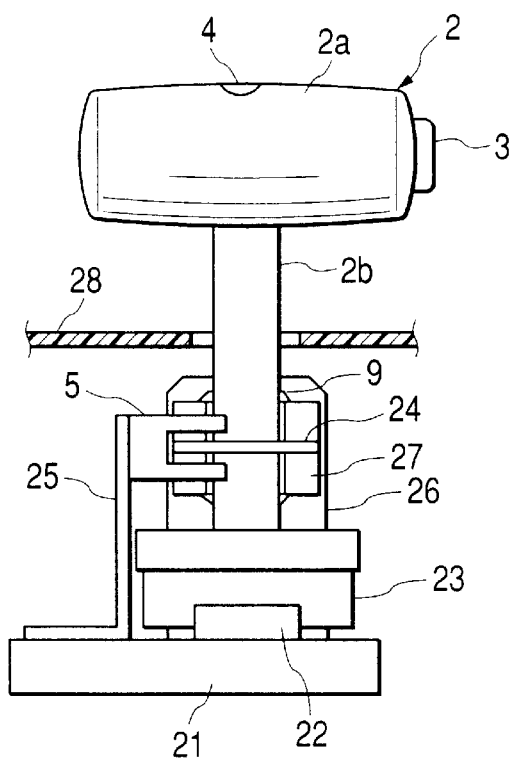
FIG. 4 is a side view, partially in cross-section, of mechanisms provided in a shift lever device for a vehicle according to a first embodiment of the present invention.
Figure 5:
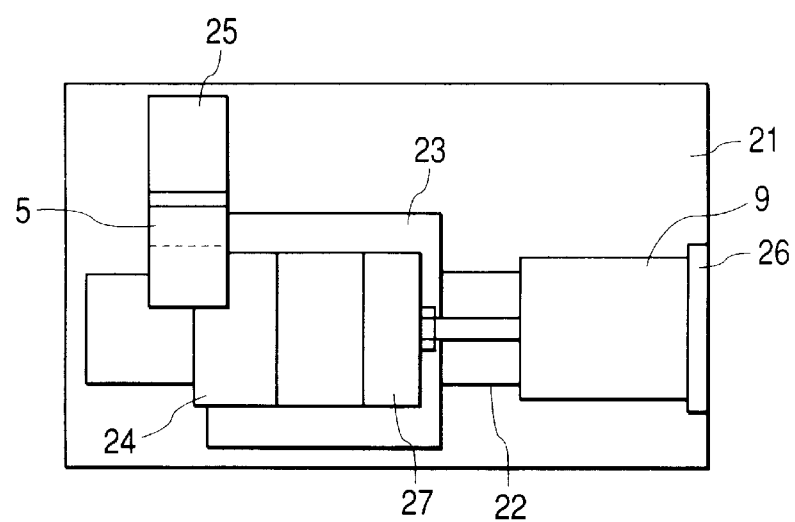
FIG. 5 is a plan view of mechanisms provided in a shift lever device for a vehicle e cover removed excluding a shift lever according to the first embodiment of the present invention.

With reference to FIGS. 1 to 5, a by-wire shift lever device for a vehicle according to one embodiment of the present invention will be described. FIG. 1 is a block diagram illustrating a structure of a shift lever device for a vehicle according to the present embodiment; FIG. 2 is a perspective view of a shift lever and a shift position display provided in the shift lever device according to the present embodiment; FIG. 3 is a front view of mechanisms provided in the shift lever device according to the present embodiment; FIG. 4 is a side view of mechanisms provided for the shift lever device according to the present embodiment; and FIG. 5 is a plan view of mechanisms provided in the shift lever device according to the present embodiment excluding the shift lever.

As shown in FIG. 1, a shift lever device for a vehicle of the present embodiment generally includes: a control section 1; a shift lever 2; a lock release switch 3 and a finger detecting sensor 4 provided in the shift lever 2; an encoder (position sensor) 5 which transmits a position signal according to a direction and an amount of operation (acceleration) of the shift lever 2; a solenoid 7 and a solenoid driver 8 for shifting gears of a transmission 6; a voice coil motor (an actuator) 9 for applying an external force to the shift lever 2; and a motor driver 10. The control section 1 includes: a CPU 11, a ROM 12 having a pre-stored work program and the like; a RAM 13 for storing parameters and constants required for computation; a lock release switch 3; a signal input section 14 for taking each output signal from the finger detecting sensor 4 and the encoder 5; and a signal transmission section 15 for transmitting a control signal for the solenoid driver 8 and the motor driver 10.

As the lock release switch 3, a push button switch may be used, and as the finger detecting sensor 4, a non-contact sensor such as a photo interrupter or a contact-type sensor such as an electrostatic switch may be employed. Moreover, as the encoder 5, a linear-type or rotary-type encoder which is operated optically or electrically may be used. The solenoid 7 is linked with a fork (not shown) for shifting gears provided in the transmission 6, so that the gears of the transmission 6 are shifted by operating the fork.

As shown in FIGS. 2 to 5, the shift lever 2 and its peripheral mechanisms are generally composed of: a base 21, a rail 22 provided on an upper surface of the base 21; a slider 23 which moves linearly along the rail 22; the shift lever 2 fixed on the slider 23; the lock release switch 3 and the finger detecting sensor 4 provided in a grip portion 2a of the shift lever 2; an operation section 24 of the encoder provided in a shaft 2b of the shift lever 2; the encoder 5 attached on the base 21 via a bracket 25; the voice coil motor 9 attached on the base 21 via a bracket 26; a connecting rod 27 for linking the shaft 2b of the shift lever 2 and a driving shaft 9a of the voice coil motor 9; and a cover 28 having a surface which shows shift positions for the shift lever 2. The shift position P of the shift lever 2 as shown in FIG. 2 is for park, R for reverse, N for neutral, and D for drive. Looking from an operator of a vehicle, the shift position P for park is located near the front side while the D for drive is located near the operator. It should be noted that the shift lever device could be rotated 90° such that P for park would be located toward the front of the vehicle and D for drive is located near the rear of the vehicle without departure from the invention.

Next, an operation of the shift lever device for a vehicle having the above-described structure will be described.

When an ignition key provided in a vehicle is turned to an accessory or a start position, the control section 1 repeatedly receives a position signal a transmitted from the encoder 5 to identify a current position of the shift lever 2. From this state, when the operator touches the grip portion 2a of the shift lever 2 or a hand of the operator becomes close to it, the finger detecting sensor 4 detects it and transmits the finger detecting signal b to the control section 1. When the finger detecting signal b is input to the control section 1, the control section 1 transmits from the signal transmission section 15 to the motor driver 10 the motor controlling signal c in a mode corresponding to the position signal a. The motor driver 10 transmits the motor driving signal d in a mode according to the motor controlling signal c. The voice coil motor 9 is driven by the motor driving signal d, and applies to the shift lever 2 the external force in the mode according to the current shift position. Each mode of the external force at each shift position can be adjusted by changing a degree of the external force applied from the voice coil motor 9 at each shift position, a frequency of an oscillation as the external force, an oscillation mode of the oscillation as the external force, or a combination of those. By feeling the external force, the operator knows the current position of the shift lever 2 by touch.

When the operator applies to the shift lever 2 an operation force for shifting a shift position of the shift lever 2, the control section 1 identifies a direction of the operation of the shift lever 2 from a change in the position signal a. Likewise, the control section 1 identifies a degree and a direction of the operation force applied to the shift lever 2 from an acceleration of the change in the position signal a. In the case where the shifting operation is to shift the shift lever 2 from P (park) to R (reverse), from R (reverse) to P (park) or from N (neutral) to R (reverse), which is an operation from a predetermined shift position in a certain direction, the control 1 transmits from the signal tranmission section 15 to the motor driver 10 a motor controlling signal c according to the degree and direction of the operation force. Accordingly, the motor driver 10 transmits the motor driving signal d according to the motor controlling signal c. The voice coil motor 9 is driven by the motor driving signal d so as to apply to the shift lever 2 an external force larger than the operation force and in a direction opposite to the operation force. Thereby, shifting from P (park) to R (reverse), from R (reverse) to P (park), or from N (neutral) to R (reverse) is prohibited so as to prevent misoperation of the shift lever 2.

When the lock release switch 3 provided in the shift lever 2 is operated while the shift lever 2 is in position P (park), R (reverse), or N (neutral), the control section 1 receives the lock release signal e transmitted from the lock release switch 3. From this state, when an operation force is applied to shift the shift lever 2 from P (park) to R (reverse), from R (reverse) to P (park) or from N (neutral) to R (reverse), the control section 1 identifies a direction of the operation of the shift lever 2 from a change in the position signal a. Likewise, a degree and a direction of the operation force applied to the shift lever 2 is identified from acceleration of the change in the position signal a. Then, the control 1 transmits from the signal output section 15 to the motor driver 10 the motor controlling signal c according to the degree and direction of the operation force. Accordingly, the motor driver 10 outputs the motor driving signal d according to the motor controlling signal c. The voice coil motor 9 is driven by the motor driving signal d to apply to the shift lever 2 the external force smaller than the operation force and in a direction opposite to the operation force. Thus, when the shift lever 2 is shifted from one position to the other positions, the right amount of resistance is imparted to the shift lever 2, thus enabling to obtain desirable operability for the shift lever 2. The shift lever 2 slides along the rail 22 on the base 21.

Likewise, when the shift lever 2 is shifted from P (park) to R (reverse), from R (reverse) to P (park), or from N (neutral) to R (reverse), the control section 1 identifies the shift position of the shift lever 2 after shifted from the position signal after the shift. Then, the control section 1 transmits the motor controlling signal c according to the position signal a to drive the voice coil motor 9, and applies to the shift lever 2 of external force in a mode according to the shift position after the shift. Similar to applying the external force in a mode according to the current shift position of the shift lever 2, the mode of external forces at each shift position after shifted can be adjusted by changing a degree of external forces applied from the voice coil motor 9 at each shift position, a frequency of oscillation as the external force, an oscillation mode of the oscillation as the external force, or a combination of those. The operator perceives the external force so that it is possible to know the shift position of the shift lever 2 after the shift by touch.

Likewise, the shift lever 2 is shifted from R (reverse) to N (neutral), from N (neutral) to D (drive) or D (drive) to N (neutral) in the same manner described above. That is, when the shift lever 2 is shifted, the right amount of resistance is imparted to the shift lever 2, and the external force in the mode according to the shift position after shifting is applied to the shift lever 2.

Accordingly, when the shift lever 2 is operated to the R (reverse) position from D (drive) position by going through the N (neutral) position, or from D (drive) position to the P (park) position by going through the N (neutral) position and the R (reverse) position, the resistance is applied as passing by the N (neutral) and R (reverse), so that a tactile feedback can be felt as operating the shift lever 2. Thus, whether or not the operation is done securely can be felt by touch. Moreover, every time the shift lever is shifted to each shift position, external forces in the mode unique to each shift position is applied, thus enabling to feel by touch which shift position is being passed.

When the operator perceives that the shift lever 2 is in a required position and finishes operation of the shift lever 2, the control section 1 controls the voice coil motor 9 to apply a required external force to the shift lever 2 to lock the shift lever 2 in the required position.

When the shift lever 2 is operated, the control section 1 transmits from the signal output section 15 to the solenoid driver 8 a solenoid controlling signal f in a mode corresponding to the position signal a. Thus, the solenoid driver 8 transmits a solenoid driving signal g in a mode corresponding to the solenoid controlling signal f. Accordingly, the solenoid 7 is driven by the solenoid driving signal g to drive a fork (not shown) for shifting gears provided in the transmission 6, thus shifting the gear of the transmission 6 in the shift position corresponding to the shift position of the shift lever 2.

In the shift lever device for a vehicle according to the present embodiment, when the shift lever 2 is shifted without operating the lock release switch 3 from P (park) to R (reverse), from R (reverse) to P (park), or from N (neutral) to R (reverse), a motion of the shift lever 2 to other shift positions by driving the voice coil motor 9 is prohibited. Therefore, it is possible to simplify its structure greatly as compared to conventional counterparts having a mechanical operation-locking mechanism, thus enabling to downsize the shift lever device for a vehicle.

In the shift lever device according to the present embodiment, when the shift lever 2 is shifted from one position to other positions, the right amount of resistance is imparted to the shift lever 2 by driving the voice coil motor 9. Therefore, it is possible to simplify its structure greatly as compared to the conventional shift lever device having a mechanical resistance imparting mechanism, and thus enabling to downsize the shift lever device for a vehicle.

Moreover, in the shift lever device according to the present embodiment, the shift lever 2 includes the finger detecting sensor 4. When fingers touch the shift lever 2, the voice coil motor 9 is driven by a output signal transmitted from the finger detecting sensor 4, so that the external forces in the mode unique to each shift position is applied to the shift lever 2. Thus, it is possible to give a tactile feedback to the operator on the shift position of the shift lever by touch thereby easing the operation of the shift lever 2.

Furthermore, in the shift lever device according to the present embodiment, when the shift lever 2 is shifted from one shift position to other shift positions, the voice coil motor 9 is driven corresponding to the output signal a from the encoder 5 to apply the external forces in the mode unique to the position of the shift lever 2 after shifted. Thus, the tactile feedback is given to the operator on the shift position of the shift lever after shifted, thus enabling to ease the operation of the shift lever 2.

In the shift lever device according to the present embodiment, the voice coil motor 9 is employed as an actuator for applying the external force to the shift lever 2. As a result, there is no need to provide a mechanism to transfer a rotary motion to a linear motion, thus enabling to downsize the shift lever device for a vehicle as compared to the case where a rotary motor is used.

Figure 6:
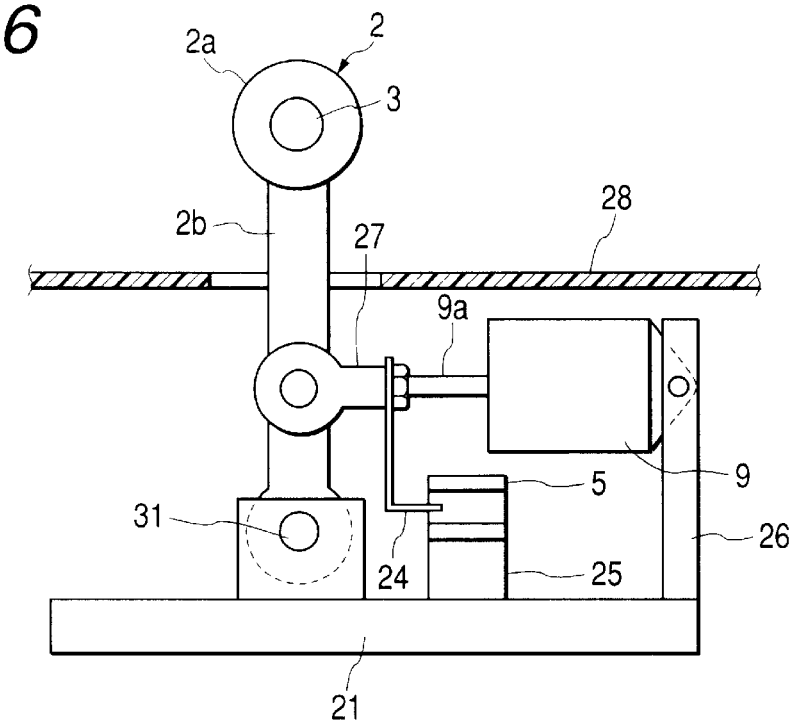
FIG. 6 is a front view, partially in cross-section, of mechanisms provided in a shift lever device for a vehicle according to a second embodiment of the present invention.

Now, referring to FIG. 6, a shift lever device for a vehicle according to a second embodiment of the present invention will be described. FIG. 6 is a front view of the shift lever device for a vehicle according to the second embodiment of the present invention.

As clearly seen from this figure, the shift lever device for a vehicle in the present embodiment is characterized in that: a lower end portion of the shift lever 2 is attached to a shaft 31 swingably set on a base 21; and the operation section 24 of the encoder 5 is attached to the connecting rod 27 which links the driving shaft 9a of the voice coil motor 9 and the shaft 2b of the shift lever 2.

The shift lever device according to the present embodiment has a similar effect to the shift lever device according to the first embodiment of the present invention, except that the shift lever 2 swings about the shaft 31.

Figure 7:
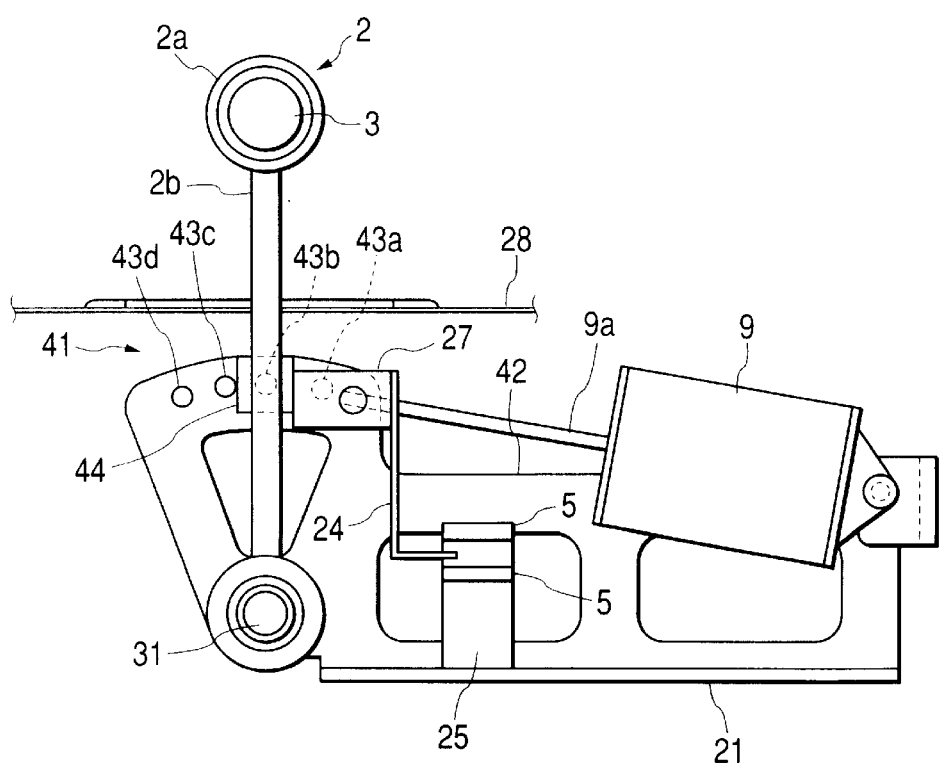
FIG. 7 is a front view of a shift lever device according to a third embodiment of the present invention.
Figure 8:
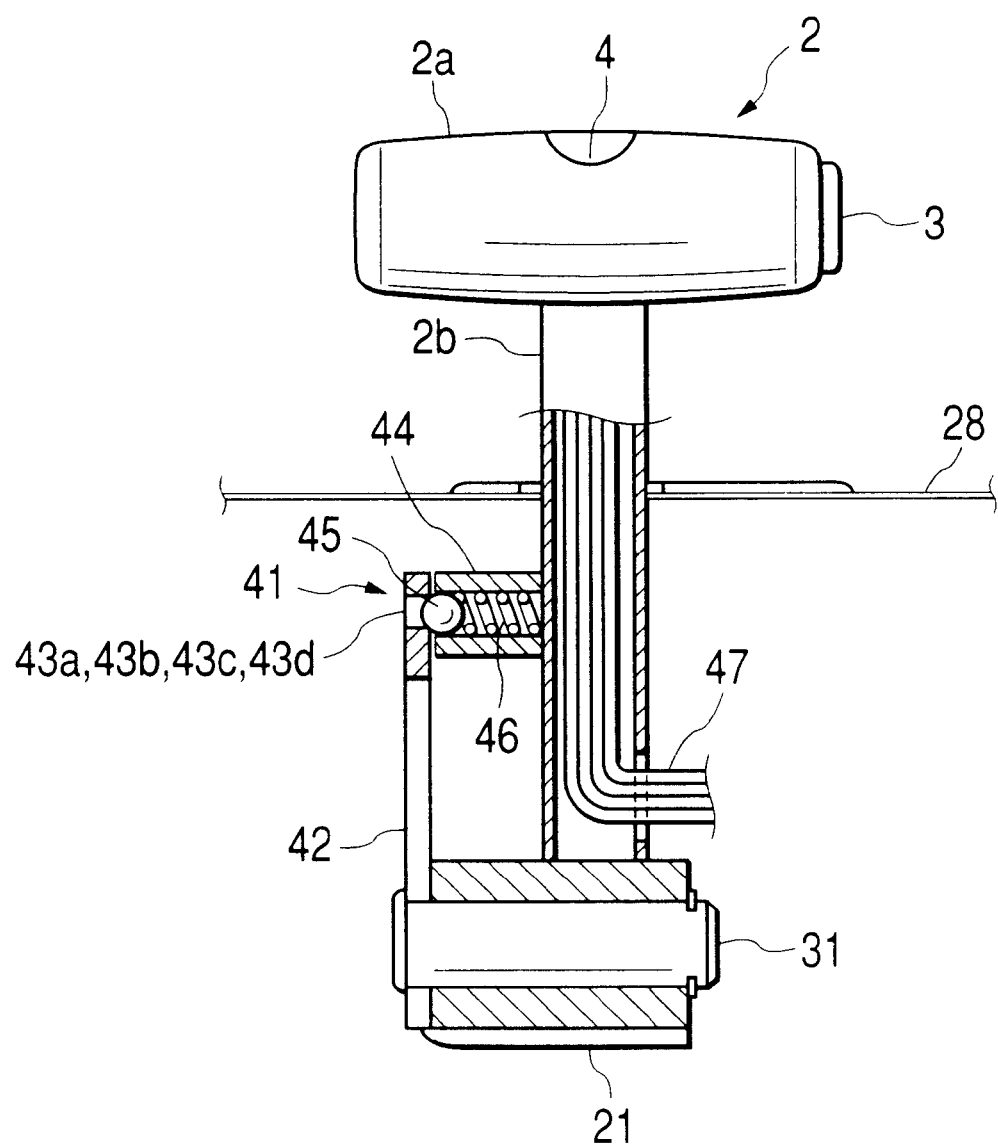
FIG. 8 is a cross-sectional view of main parts of a shift lever device for a vehicle according to a third embodiment of the present invention as viewed from the side.

Next, with reference to FIGS. 7 and 8, a shift lever device for a vehicle according to a third embodiment of the present invention will be described. FIG. 7 is a front view of the shift lever device for a vehicle according to the third embodiment of the present invention, and FIG. 8 is a cross-sectional view of main parts of the shift lever device for a vehicle according to the third embodiment of the present invention as viewed from the side. In these figures, reference numeral 41 denotes latching means for the shift lever 2; 42 denotes a faceplate rising perpendicularly from the base 21; 43a, 43b, 43c, 43d denote ball latching apertures provided through the faceplate 42; 44 denotes a ball plunger provided in the shift lever 2; 45 denotes a ball within the ball plunger 44; 46 denotes a spring for biasing the ball 45 outward; and 47 denotes a lead wire connected to the lock release switch 3 and the finger detecting sensor 4. The same elements shown in FIG. 6 are denoted by the same reference numerals.

As it is clear from FIGS. 7 and 8, the shift lever device for a vehicle according to the present embodiment is characterized in that latching means 41 for holding the shift lever 2 is provided at each shift position of the shift lever, i.e., P (park), R (reverse), N (neutral) and D (drive).

The latching means 41 is set in the ball plunger 44 and the ball latching apertures 43a, 43b, 43c, and 43d provided in the faceplate 42, and includes the ball 45 biased outward by the spring 46. A position for providing each of the ball latching apertures 43a, 43b, 43c, and 43d is on a circular arc having a radius r as shown in FIG. 7, the radius r being the distance from the shaft 31 as a center to a position in which the ball 45 is provided. The position is adjusted so that the shift lever is held at each shift position (i.e., P (park), R (reverse), N (neutral) and D (drive)) when the ball 45 is latched.

Structures of other portions are the same as those of the shift lever device for a vehicle in FIG. 6, and the corresponding members are denoted by the same reference numerals used therein, thus omitting a description thereof.

In the shift lever device for a vehicle according to the present embodiment, the ball 45 is selectively latched by one of the ball latching apertures 43a, 43b, 43c, or 43d when the shift lever 2 is shifted to each shift position, i.e., P (park), R (reverse), N (neutral), or D (drive). When the ball is latched by the ball latching apertures 43a, 43b, 43c, or 43d, the shift lever 2 is stopped on the faceplate 42 via the ball 45. Thus, the shift lever 2 can be held at the required shift position after being released from a hand of the operator without driving the voice coil motor 9. Therefore, during a period that the ball 45 is selectively latched by one of the ball latching apertures 43a, 43b, 43c, or 43d, the power supply to the voice coil motor 9 is interrupted, thus reducing consumption of a battery mounted on a vehicle.

Similarly to the shift lever devices for a vehicle according to the first and second embodiments, shifting of the shift lever 2 to other shift positions can be done by the operator by operating the shift lever 2 in the predetermined direction. Specifically, as the operator apply the operation force to the shift lever 2, the ball 45 moves into the ball plunger 44 as resisting against elasticity of the spring 46 so that the latching of the ball 45 by the ball latching aperture 43a, 43b, 43c, and 43d is disengaged, thus enabling the shifting of the shift lever 2. As such, because the shift lever device for a vehicle of the present embodiment employs the ball plunger 44 as the latching means 41 for the shift lever 2, it is possible to easily disengage the latching of the shift lever 2 by applying forces in the direction of operation by the operator. Therefore, the operability of the shift lever 2 would not be deteriorated.

In the shift lever device for a vehicle of the present embodiment, the shift lever 2 is held at each shift position. Alternatively, it is possible to hold the shift lever 2 at one or a plurality of shift positions selected amongst each shift position. For example, among the shift positions of the shift lever 2, the ball latching aperture 43a may be provided in a section corresponding to the P (park) position so that the shift lever 2 is held only at the P (park) position. When the shift lever 2 is shifted into the P (park) position, an engine of a vehicle is usually turned off, and thus, it would be a problem in terms of the consumption of a battery mounted on a vehicle for a structure, in which the voice coil motor is constantly energized. However, in the shift lever device for a vehicle according to the present embodiment has a structure in which the shift lever 2 is held by a mechanical latching means 41, the abovementioned problem can be solved.

In the shift lever device for a vehicle of the present embodiment, the ball latching apertures 43*a*, 43*b*, 43*c* and 43*d* is provided in the faceplate 42. Alternatively, indentations may be formed on the faceplate 42.

In the shift lever device for a vehicle of each of the above-described embodiments, the voice coil motor 9 is used as an actuator to apply external forces to the shift lever 2. Alternatively, a linear motor or a rotary motor can be used.

In one embodiment of the present invention has a structure including: a shift lever; a position sensor for transmitting a position signal according to a direction and an amount of operation of the shift lever; an actuator for applying an external force to the shift lever; and a control section for receiving the position signal and controlling the actuator according to the position signal, wherein when the control section determines from the position signal that the shift lever is positioned at a predetermined shift position, the control section controls the actuator to apply the external force so as to lock the shift lever in the shift position. According to the structure, when the shift lever is being shifted to a predetermined shift position, the actuator applies the external force to the shift lever, thereby locking the shift lever in the shift position. Accordingly, it is possible to greatly simplify the structure of the shift lever as compared to a shift lever having a mechanical operation-locking mechanism, thus downsizing the shift lever device for a vehicle.

In another embodiment of the present invention has a structure including: a shift lever; a lock release switch provided in the shift lever; a position sensor for transmitting a position signal according to a direction and an amount of operation of the shift lever; an actuator for applying an external force to the shift lever; and a control section for controlling the actuator, the control section being connected to the lock release switch and receiving the position signal, wherein when the control section receives the position signal indicating the shift lever at a predetermined position being operated in a certain direction without operating the lock release switch, the control section controls the actuator to prohibit the operation of the shift lever in the certain direction. According to the structure, when the shift lever is operated from the predetermined shift position in the certain direction without operating the lock release switch, the actuator applies the external force to the shift lever so as to prohibit the operation of the shift lever from the predetermined shift position in the certain direction. Accordingly, it is possible to greatly simplify the structure of the shift lever as compared to a shift lever having a mechanical operation-locking mechanism, thus downsizing of the shift lever device for a vehicle.

In yet another embodiment, the present invention has a structure including: a shift lever; a position sensor for transmitting a position signal according to a direction and an amount of operation of the shift lever; an actuator for applying an external force to the shift lever; and a control section for receiving the position signal and controlling the actuator according to the received position signal, wherein when the control section receives the position signal indicating the shift lever being operated, the control section controls the actuator to apply the external force according to the position signal so as to impart a resistance associated with the operation of the shift lever. According to the structure, when the shift lever is operated, the actuator applies the external force to the shift lever so as to impart the resistance to the operation of the shift lever. Accordingly, it is possible to greatly simplify the structure of the shift lever as compared to a shift lever having a mechanical resistance imparting mechanism, thus downsizing the shift lever device for a vehicle.

In another embodiment, the present invention has a structure including: a shift lever; a position sensor for transmitting a position signal according to a direction and an amount of operation of the shift lever; an actuator for applying an external force to the shift lever; a finger detecting sensor for transmitting a detection signal by detecting touch of fingers on the shift lever; and a control section for receiving the position signal and the detection signal and controlling the actuator according to the position signal and the detection signal, wherein when the control section receives the detection signal, the control section controls the actuator to apply to the shift lever the external force in a mode unique to the shift position of the shift lever so as to give an operator a tactile feedback on the shift position of the shift lever. According to the structure, when the fingers of the operator touch the shift lever, the actuator applies the external force to the shift lever so as to apply to the shift lever the external force in a mode unique to each shift position. Accordingly, it is possible to give the operator a tactile feedback on the shift position of the shift lever, thus enabling to ease the operation of the shift lever.

In yet another embodiment, the present invention has a structure including: a shift lever; a position sensor for transmitting a position signal according to a direction and an amount of operation of the shift lever; an actuator for applying an external force to the shift lever; and a control section for receiving the position signal and controlling the actuator according to the position signal, wherein when the shift lever is shifted from one position to another position by the position signal, the control section controls the actuator to apply to the shift lever the external force in a mode unique to the other shift position so as to give an operator a tactile feedback on the shift position of the shift lever. According to the structure, when the shift lever is shifted from one position to another position, the actuator applies the external force to the shift lever so as to apply to the shift lever the external force in a mode unique to the shift position after being shifted. Accordingly, it is possible to give the operator a tactile feedback on the shift position of the shift lever after being shifted, thus enabling to ease the operation of the shift lever.

What is claimed is:

1. A by-wire shift lever device for a vehicle comprising: a shift lever; a position sensor for transmitting a position signal according to a direction and an amount of operation of the shift lever; an actuator for applying an external force to the shift lever; and a control section for receiving the position signal and controlling the actuator according to the position signal, wherein when the control section determines from the position signal that the shift lever is positioned at a predetermined shift position, the control section controls the actuator to apply the external force so as to lock the shift lever in the shift position.

2. A by-wire shift lever device according to claim 1, wherein the actuator is a voice coil motor.

3. A by-wire shift lever device according to claim 2, wherein latching means for holding the shift lever in a predetermined position is provided therein.

4. A by-wire shift lever device according to claim 1, wherein latching means for holding the shift lever in a predetermined position is provided therein.

5. A by-wire shift lever device for a vehicle comprising: a shift lever; a lock release switch provided in the shift lever; a position sensor for transmitting a position signal according to a direction and an amount of operation of the shift lever; an actuator for applying an external force to the shift lever; and a control section for controlling the actuator, the control section being connected to the lock release switch and receiving the position signal, wherein when the control section receives the position signal indicating the shift lever at a predetermined position being operated in a certain direction without operating the lock release switch, the control section controls the actuator to prohibit the operation of the shift lever in the certain direction.

6. A by-wire shift lever device according to claim 5, wherein the actuator is a voice coil motor.

7. A by-wire shift lever device according to claim 6, wherein latching means for holding the shift lever in a predetermined position is provided therein.

8. A by-wire shift lever device according to claim 5, wherein latching means for holding the shift lever in a predetermined position is provided therein.

9. A by-wire shift lever device for a vehicle comprising: a shift lever; a position sensor for transmitting a position signal according to a direction and an amount of operation of the shift lever; an actuator for applying an external force to the shift lever; and a control section for receiving the position signal and controlling the actuator according to the received position signal, wherein when the control section receives the position signal indicating the shift lever being operated, the control section controls the actuator to apply the external force according to the position signal so as to impart a resistance associated with the operation of the shift lever.

10. A by-wire shift lever device according to claim 9, wherein the actuator is a voice coil motor.

11. A by-wire shift lever device according to claim 10, wherein latching means for holding the shift lever in a predetermined position is provided therein.

12. A by-wire shift lever device according to claim 9, wherein latching means for holding the shift lever in a predetermined position is provided therein.

13. A by-wire shift lever device for a vehicle comprising: a shift lever; a position sensor for transmitting a position signal according to a direction and an amount of operation of the shift lever; an actuator for applying an external force to the shift lever; a finger detecting sensor for transmitting a detection signal by detecting touch of fingers on the shift lever; and a control section for receiving the position signal and the detection signal and controlling the actuator according to the position signal and the detection signal, wherein when the control section receives the detection signal, the control section controls the actuator to apply to the shift lever the external force in a mode unique to the shift position of the shift lever so as to give an operator a tactile feedback on the shift position of the shift lever.

14. A by-wire shift lever device according to claim 12, wherein the actuator is a voice coil motor.

15. A by-wire shift lever device according to claim 14, wherein latching means for holding the shift lever in a predetermined position is provided therein.

16. A by-wire shift lever device according to claim 13, wherein latching means for holding the shift lever in a predetermined position is provided therein.

17. A by-wire shift lever device for a vehicle comprising: a shift lever; a position sensor for transmitting a position signal according to a direction and an amount of operation of the shift lever; an actuator for applying an external force to the shift lever; and a control section for receiving the position signal and controlling the actuator according to the position signal, wherein when the shift lever is shifted from one position to another position by the position signal, the control section controls the actuator to apply to the shift lever the external force in a mode unique to the other shift position so as to give an operator a tactile feedback on the shift position of the shift lever.

18. A by-wire shift lever device according to claim 17, wherein the actuator is a voice coil motor.

19. A by-wire shift lever device according to claim 18, wherein latching means for holding the shift lever in a predetermined position is provided therein.

20. A by-wire shift lever device according to claim 17, wherein latching means for holding the shift lever in a predetermined position is provided therein.

* * * * *

UNITED STATES PATENT AND TRADEMARK OFFICE
CERTIFICATE OF CORRECTION

PATENT NO.   : 6,508,139 B2
DATED        : January 21, 2003
INVENTOR(S)  : Mikio Onodera It is certified that error appears in the above-identified patent and that said Letters Patent is hereby corrected as shown below:

<u>Column 12,</u>
Line 13, delete "claim 12," and substitute -- claim 13, -- in its place.

Signed and Sealed this

Tenth Day of June, 2003

JAMES E. ROGAN
*Director of the United States Patent and Trademark Office*